Nov. 28, 1939.  E. L. LORD  2,181,304
HOLD-DOWN FOR STORAGE BATTERIES
Filed March 31, 1938

WITNESS:

INVENTOR
Edward L. Lord
BY
Augustus B. Stoughton
ATTORNEY.

Patented Nov. 28, 1939

2,181,304

UNITED STATES PATENT OFFICE 2,181,304

HOLD-DOWN FOR STORAGE BATTERIES

Edward L. Lord, Glenside, Pa., assignor to The Electric Storage Battery Company, Philadelphia, Pa., a corporation of New Jersey Application March 31, 1938, Serial No. 199,123

4 Claims. (Cl. 180—68.5)

Experience indicates that hold-down devices which operate in the direction of the plane of the wall of a battery case are not satisfactory because the resulting strain tends to distortion of the wall and consequent breaking of the seal; thus allowing electrolyte to leak out. Likewise frames which bear on the top edge of the wall of the case are not satisfactory because they are subject to corrosion since they are arranged in proximity with an acid condition which may exist at the top of the battery.

One object of the present invention is to obviate these defects and disadvantages and to provide a simple, reliable and comparatively inexpensive device which will securely hold the battery in place with minimum danger of corrosion and which is particularly well adapted for use where head room is limited as is the case in battery compartments on railway motor cars and in other commercial constructions.

Other objects of the invention will appear from the following description at the end of which the invention will be claimed.

In my invention use is made of a structure adapted to be secured in position and by exerting a compressive force on confronting walls of a battery case to oppose up and down movements thereof and my invention consists of a pair of spaced confronting gripping elements and oppositely disposed elements connected with said gripping elements and constituting with them a frame structure adapted to receive a battery case and oppose movement thereof in one plane and means for positioning and flexing the last named elements to cause the gripping elements to exert compressive force on the battery case and oppose movement thereof in a plane at right angles to the first mentioned plane.

The invention also comprises the improvements to be presently described and finally claimed.

Figure 1:
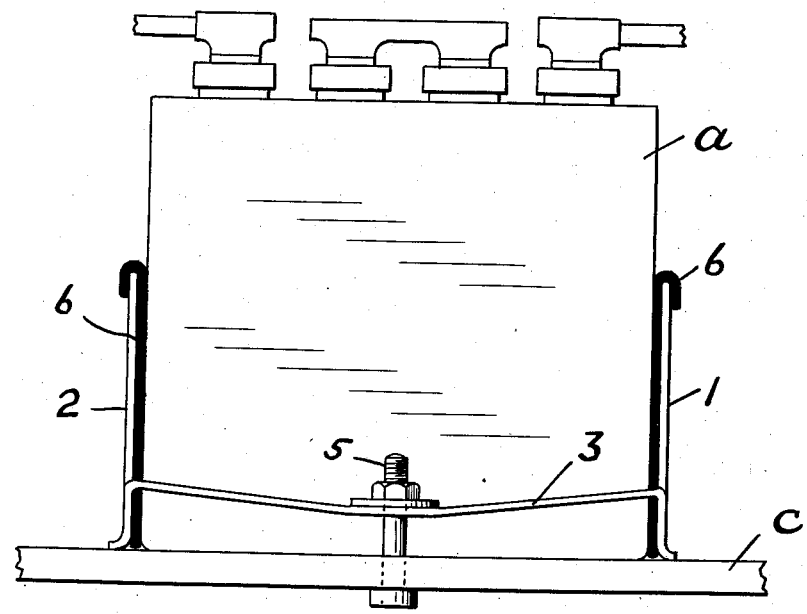
Figure 2:
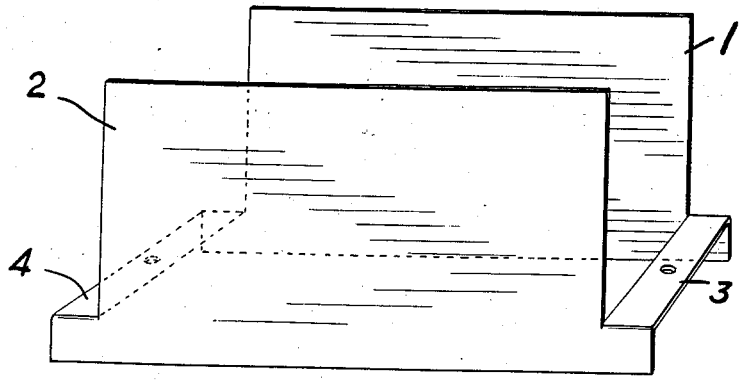

In the following description reference will be made to the accompanying drawing forming part hereof and in which, Figure 1 is an elevational view of a hold-down structure embodying features of the invention and shown in association with a battery case, and Figure 2 is a perspective view of a hold-down structure embodying features of the invention.

Referring to the drawings, 1 and 2 indicate a pair of spaced confronting gripping elements. 3 and 4 indicate oppositely disposed elements rigidly connected with the gripping elements and constituting with them a frame structure adapted to receive a battery case $a$ and to oppose movement of the battery case in a horizontal plane. 5 are means for positioning and flexing the elements 3 and 4 in order to cause the gripping elements 1 and 2 to exert compressive force on the battery case and oppose movement of the battery case in a generally vertical plane. The means 5 are shown as bolts passing through structure $c$ in respect to which the battery is to be immovably held.

In use the flexing of the elements 3 and 4 causes them to operate like springs acting on the gripping elements 1 and 2 and it is a matter of convenience that the elements 3 and 4 are flexed by the same means which secure the hold-down structure in place on the support $c$. Furthermore the act of releasing the means 5 in respect to the support $c$ also frees the battery case so that it may be readily removed. The end elements 3 and 4 are rigidly connected with the side elements at points above the supporting edge of the elements. This is embodied in the structure shown in the drawing and may be embodied in other constructions as will be apparent to those skilled in the art but the construction shown in the drawing has the advantage that it may be made from a single sheet of metal. 6 indicates sponge rubber or other acid-proof cushions secured to the gripping elements 1 and 2 and they serve to evenly distribute pressure on the face of the battery case and also assist in holding the battery case in place due to the locking effect resulting from the cushion material being forced by pressure into surface irregularities in either the battery case or the gripping elements 1 and 2. In the instance of many battery cases the maximum pressure of the gripping elements 1 and 2 is exerted at the corners of the case where the case is the strongest.

It will be obvious to those skilled in the art to which the invention relates that modifications may be made in details of construction and arrangement without departing from the spirit of the invention which is not limited in respect to such matters or otherwise than as the prior art and the appended claims may require.

I claim:

1. A hold-down for storage batteries adapted to be secured in position and to frame the battery case and oppose sidewise movement thereof and by exerting a compressive force on confronting walls of the case to oppose up and down movements thereof, said hold-down comprising a pair of spaced confronting gripping elements and oppositely disposed elements connected with said gripping elements and constituting with them a frame structure adapted to receive a battery case and oppose movement thereof in one plane and means for positioning and flexing the last mentioned elements to shorten their effective length to cause the gripping elements to exert compressive force on the battery case and oppose movement thereof in a plane at right angles to the first mentioned plane.

2. A hold-down comprising side and end elements constituting a frame adapted to receive and surround a battery case, said end elements being rigidly connected with the side elements above the lower edges thereof and adapted when flexed to be shortened in effective length to cause the side elements to grip the case.

3. A hold-down comprising side and end elements constituting a frame adapted to receive and surround a battery case, at least one of said end elements being rigidly connected with the side elements, and means for flexing said end element away from a straight line thereby to shorten its effective length to cause the side elements to grip the case.

4. A hold-down for a storage battery comprising, a frame having at least a portion of bendable material and arranged to engage the vertical walls of the battery, a stationary element on which the battery is supported, and an adjustable element connecting said frame and said stationary element and arranged to bend said frame so as to clamp the battery.

EDWARD L. LORD.